United States Patent [19]

Magness

[11] 4,360,285

[45] Nov. 23, 1982

[54] RAIL AND POST CONNECTOR

[76] Inventor: Howard A. Magness, 24 Bonnie Ave., Bel Air, Md. 21014

[21] Appl. No.: 223,899

[22] Filed: Jan. 9, 1981

[51] Int. Cl.³ .............................. F16B 7/08; F16B 9/00
[52] U.S. Cl. ...................................... 403/187; 256/65; 403/169; 403/230; 403/264
[58] Field of Search .............. 403/187, 401, 402, 295, 403/297, 230, 406, 264, 169–178, 231; 256/65

[56] References Cited

U.S. PATENT DOCUMENTS 3,529,808 9/1970 Siebers .............................. 403/264X
3,643,989 2/1972 Sattler ................................ 403/295
3,962,774 6/1976 Noro ................................ 403/264 X
4,105,348 8/1978 Anderson et al. .............. 403/295 X Primary Examiner—Wayne L. Shedd
Attorney, Agent, or Firm—John F. McClellan, Sr.

[57] ABSTRACT

A connector to unite rail and post in a railing or the like by means of adjustable frictional engagement within the rail, adjustment being through a plurality of barbs extending from a leg of the connector and bendable toward or away from the leg to adjust fit with the rail; the barbs have free ends oriented toward the middle of the connector, making the connector easier to assemble to the rail than to pull apart from the rail.

1 Claim, 4 Drawing Figures

OLD ART

OLD ART

RAIL AND POST CONNECTOR

This invention relates generally to connectors and specifically to rail and post connection systems.

BACKGROUND OF THE INVENTION

In the prior art, various connection devices have been disclosed including those in the following U.S. Patents:

U.S. Pat. No. 3,031,217 to G. A. Tinnerman, 4-24-62, disclosed an angle clip with arched protrusions on an outer face;

U.S. Pat. No. 3,343,811 to E. J. Kusel et al, 9-26-67, disclosed a curved pushdown end on an angle clip; the downward leg was narrow and slotted;

U.S. Pat. No. 3,529,808 to E. A. Siebers, 9-22-70, disclosed an angle clip with a corrugated arm for frictional retention within a "U" shaped railing; the downward leg was narrower, the clip could be forced along the railing to intermediate locations, and the downward leg was slotted;

U.S. Pat. No. 3,942,763 to A. Helterbrand and A. H. Logan, 5-9-76, disclosed a clip with a pulldown provision; the downward leg was narrow and slotted; the railing sides were narrowed at the bottom rather than returned.

OBJECTS OF THE INVENTION

However, it is believed that no known connection system provides the advantages of the present invention, including those set forth in the objects of this invention, which are: to provide a system of the type described which requires a minimum of material, is easily adjustable to interfit in various sizes and shapes so as to relieve manufacturing requirements, which is easy to assemble and substantially more difficult to pull loose than to assemble, which produces the least possible scratching of protective coatings on assembly, which is substantially free draining, and which is easy and economical to fabricate.

BRIEF SUMMARY OF THE INVENTION

In brief summary given as cursive description only and not as limitation, the invention includes the combination of connector for securing a rail generally in abutting relation with a post, the connector having a leg for fitting inside the rail and means for adjustably securing the fit of the leg inside the rail including a plurality of bendable barbs.

DETAILED DESCRIPTION OF THE DRAWINGS

(a) OLD ART

Figure 1:
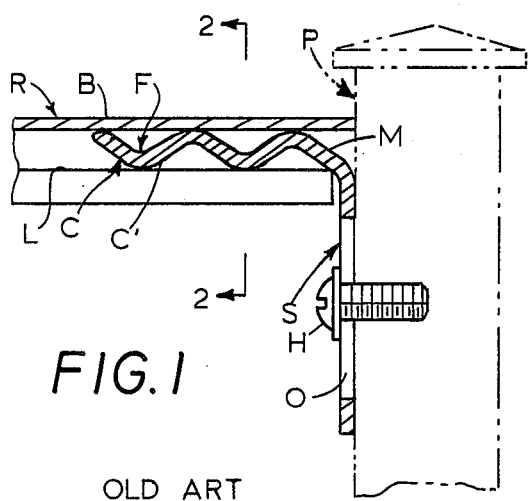
FIG. 1 is a side elevational view in partial section of an old-art connector joining a post and a rail.
Figure 2:
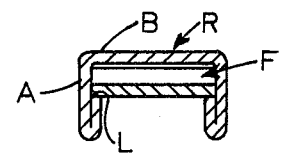
FIG. 2 is a sectional detail taken at 2—2, FIG. 1.

FIGS. 1 and 2 show a combination of post P and abutting rail R with an old art connector C, of the general type concerned in the present invention, uniting them. The rail has the shape, in section, of an inverted square "U" with a respective longitudinal ledge L along the inside of each arm A of the rail, forming a recess between the ledges and the base B of the squared "U" shape.

The connector is an elongate member with an angled middle M dividing it into a first leg F and a second leg S. The second leg has an opening O, permitting fastening to the post by a machine screw or other detachable holder H.

The recess formed by the respective ledge L, along and between the insides of the arms of the rail, receives the first leg of the connector, which has a sinusoidal shape, the convolutions C' of which should be made slightly larger in amplitude than the space between the ledges and the base B of the square "U" shape, so that when inserted, the first leg tends to form a frictional fit retaining it in the rail.

For insertion, the first leg may be driven or pressed into the rail to the position shown, resiliently flattening the convolutions and springing apart the arms of the "U" shaped section.

Although this may be a useful connector, it is believed that certain aspects of it are subject to improvement.

For example, it is evident that hammering on this member to drive it into the rail will somewhat resemble hammering on a bent nail because this structure has virtually no portion parallel with the direction of force applied; even the first part inserted could cause the connector to assume a skew angle to the driving direction. It will be apparent also that the passing convolutions may along the edges tend to shear a relatively broad swath of protective coating off the interior of the arms, that the frictional fit between the convoluted first leg and the rail cannot be readily adjusted, and that the convolutions of the arms may tend to hold water condensed from the air or otherwise trapped. It will also be apparent that the force required to pull the convoluted leg out of the rail will be no more than, and perhaps less than, the force required to drive or push it in.

(b) THE INVENTION

Figure 3:
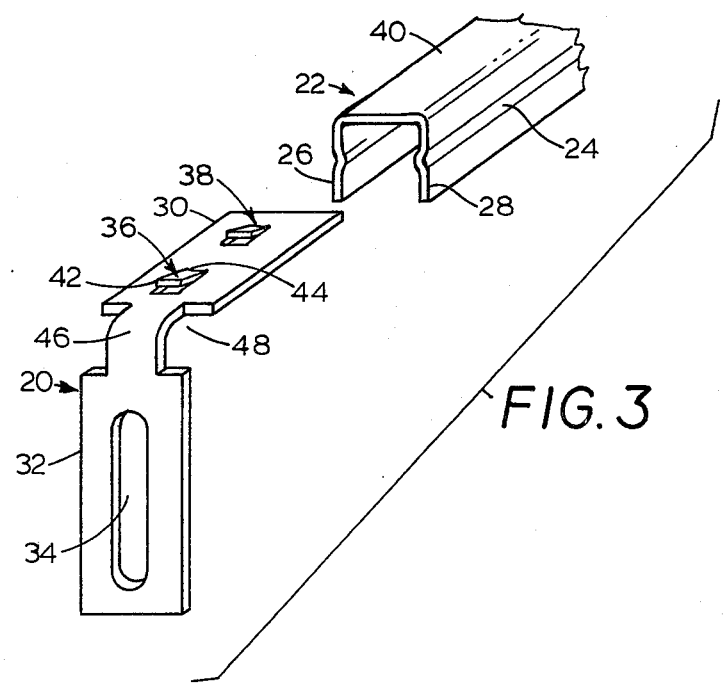
FIG. 3 is an exploded perspective view of a connector according to the present invention in position for insertion into a rail.

FIG. 3 shows in contrast the relations of the connector 20 and rail 22 of the present invention 10.

The rail 22 may be like the rail shown in reference to the prior art but preferably for economy and simplicity comprises a simple inverted, squared "U" in section with a longitudinal indentation as at 24, on each arm 26, 28 forming the ledge for receiving and supporting the straight, parallel-sided first leg 30 of the connector. The second or downturned leg 32 of the connector is relatively conventional with a slotted aperture 34 for connection by machine screw to a post.

For providing adjustable resilient frictional retention of the first leg in the rail, first and second barbs, 36, 38, extend upwardly at an inclined angle from the upper surface of the first leg in position to contact the under side of the base 40 of the "U" section rail. Preferably the barbs are in series along the centerline of the first leg for best stability.

The barbs resiliently wedge in the space or recess between the inward ridges or ledges formed by the indentation 24, and the base 40, making removal of the first leg difficult. Because each barb extension preferably comprises a square (punched out) free end 42 reaching from integral junction 44 as part of the first arm toward middle 46 of the elongate member from which the connector is formed, the first leg is more difficult to remove than to insert in the rail. Going in, the tips at the free end tend to glide over the surface of the base, but coming out, tend to dig in and resist withdrawal.

Driving forces are relatively parallel with the second leg, which is introduced in-line with the rail and remains that way when driven or pushed home until the end surface of the second leg is flush with the rail, as permitted by the conventional cutout portions 48, at the angle or bend of the connector.

Figure 4:
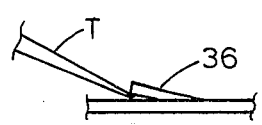
FIG. 4 is a fragmentary detail illustrating screwdriver adjustment of a barb on the present invention to adjust force of resilient engagement with a rail.

FIG. 4 is a fragmentary detail showing how friction between connector and rail can be adjusted prior to insertion by prying the barbs, 36 shown, using a tool T such as a screwdriver (or pliers can be used to bend the barbs toward or away from the plane of the first leg). Manufacturing tolerances need not be so close or otherwise, because this adjustment is possible using simple tools.

From the above it will be appreciated that the invention offers many further advantages over the prior art illustrated, in that the edges are straight, so scar less the rail surface than convolutions, in that the connector is self draining through the slots at the edges of the barbs and forms no convolution pockets, in that because the first leg is straight, less material is required to make it than to make a convoluted leg, and in that convoluted dies are not required in making this invention, nor is bending of the whole breadth of leg necessary to adjust frictional fit, but instead merely a small part, which is much easier. Preferable material for this invention is mild steel.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a connector of bendable resilient material such as steel, for uniting a post with an abutting rail having in cross-section a base and arms defining a generally squared "U" shape, the connector being an elongate member with an angled middle dividing the elongate member into a first leg and a second leg; the first leg having shape for retention in a recess along and between the inside of the arms of the rail and means for resiliently tightening the first leg in the rail, and the second leg having means for securance to a post, the improvement comprising: the means for resiliently tightening comprising a plurality of integral barbs of said bendable resilient material extending at an incline from the upper surface of the first leg in position for contacting a said base when the first leg is in a said recess, means for adjusting said tightening including each of said extension being a free end of the barb and each barb having an end opposite the free end integral with the first leg, said end opposite bendable toward and away from the plane of the first leg; self draining means for said connector comprising each barb having an adjacent slot through the connector, means making the connector harder to pull out of a said rail than to insert therein, comprising said free end of each barb being toward said angled middle of the connector, said first leg being substantially straight, said barbs being in series on the centerline of said first leg, and said first leg having substantially parallel sides.

* * * * *